(12) United States Patent
Kaliaperumal

(10) Patent No.: US 12,395,880 B2
(45) Date of Patent: Aug. 19, 2025

(54) SYSTEMS AND METHODS FOR CHANNEL SELECTION USING MEASUREMENTS BY USER EQUIPMENT

(71) Applicant: Outdoor Wireless Networks LLC, Richardson, TX (US)

(72) Inventor: Rajesh Kaliaperumal, San Jose, CA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 379 days.

(21) Appl. No.: 18/159,605

(22) Filed: Jan. 25, 2023

(65) Prior Publication Data

US 2023/0284063 A1   Sep. 7, 2023

Related U.S. Application Data

(60) Provisional application No. 63/316,106, filed on Mar. 3, 2022.

(51) Int. Cl.
 *H04W 24/10* (2009.01)
 *H04B 17/336* (2015.01)
 *H04W 16/14* (2009.01)

(52) U.S. Cl.
 CPC .......... *H04W 24/10* (2013.01); *H04B 17/336* (2015.01); *H04W 16/14* (2013.01)

(58) Field of Classification Search
 CPC .............................. H04W 24/10; H04W 16/14
 See application file for complete search history.

(56) References Cited

U.S. PATENT DOCUMENTS

| 10,708,803 | B2 * | 7/2020 | Raghothaman | H04W 72/542 |
| 2017/0188314 | A1 * | 6/2017 | Mueck | H04W 24/02 |
| 2022/0272701 | A1 * | 8/2022 | Hannan | H04W 16/14 |

OTHER PUBLICATIONS

"3rd Generation Partnership Program, 3GPP TS 38.331, Technical Specification Group Radio Access Network; NR; Radio Resource Control (RRC) protocol specification", V15.6.0, Jun. 2019, Release 15, pp. 1 through 519.
O-RAN, "O-RAN Architecture Overview", as downloaded from https://docs.o-ran-sc.org/en/latest/architecture/architecture.html on Feb. 9, 2022, pp. 1 through 2, © Copyright 2021, O-RAN Project Revision 68ddf7af.
WINFF, Operations for Citizens Broadband Radio Service (SBRS); GAA Spectrum Coordination—Approach 1, Technical Report, Document WINFF-TR-2003, May 31, 2019, Version V1.0.0, pp. Cover through 24.

* cited by examiner

*Primary Examiner* — Zhiren Qin
(74) *Attorney, Agent, or Firm* — Fogg & Powers LLC

(57) ABSTRACT

Techniques are provided for more accurately determining co-channel interference at PAL CBSDs. Techniques are also provided for determining co-channel interference at GAA CBSDS and cross link interference at PAL and GAA CBSDs. Co-channel interference at a CBSD can be mitigated by changing a channel on which the CBSD receives to an available channel. Cross link interference can be mitigated by changing a frame structure(s) of CBSD(s).

21 Claims, 5 Drawing Sheets

440

440A — Periodically Request Scheduling of Measurements, by at Least Two UEs Connected to Each Network CBSD, on the Received Frequency Channels and Adjacent Frequency Channels

Figure 4

SYSTEMS AND METHODS FOR CHANNEL SELECTION USING MEASUREMENTS BY USER EQUIPMENT

CROSS-REFERENCE TO RELATED APPLICATION

This application claims priority to U.S. Provisional Application No. 63/316,106 filed on Mar. 3, 2022 and titled "SYSTEMS AND METHODS FOR CHANNEL SELECTION USING MEASUREMENTS BY USER EQUIPMENT", the contents of which is incorporated herein in its entirety.

BACKGROUND

A citizens broadband radio service (CBRS) includes incumbent users of shared spectrum and secondary users of shared frequency spectrum. An incumbent user may also be referred to as a primary user or an incumbent. Incumbent users have priority access to transmit and/or receive in the spectrum shared with the secondary users. An incumbent user may be dynamic, e.g., naval radar, or static, e.g., fixed satellite service (FSS). Such naval radar may intermittently operate in a dynamic protection area (DPA).[1]

Secondary users may use citizens broadband radio service device(s) (CBSD(s)). A CBRS system may include at least one spectrum access system (SAS)[2]. Each SAS regulates the transmissions of certain CBSD(s) in the shared spectrum under the SAS's control, e.g., whether each CBSD of a SAS can transmit in the shared spectrum, and if so, then at what frequency spectrum and power level, to ensure that aggregate interference at incumbent user(s) and in geographic region(s), which may include PAL CBSDs, is within a corresponding interference limit(s). Upon receiving, from a SAS, authorization to transmit in shared spectrum, a CBSD is configured to act as an access point and provide a communications link with user equipment (UE) in the CBSD's coverage area.

[1] A DPA is a geographic region in which protection of an incumbent user only occurs when the incumbent user transmits in the geographic region. Optionally, a DPA is a portion of a body of water and the incumbent user is a ship using radar transmitting in the shared spectrum.
[2] Operation of a CBRS SAS is specified in Requirements for Commercial Operation in the U.S. 3550-3700 MHZ Citizens Broadband Radio Service Band, WInnForum Standard Document WINNF-TS-0112, version V. 1.9.1, dated Mar. 11, 2020 ("WINNF-TS-0112") which is hereby incorporated by reference herein in its entirety.

In CBRS, CBSDs operate using time domain duplexing. Further, in CBRS, a secondary user can either be a Priority Access License (PAL) user and/or a general authorized access (GAA) user.

Thus, a CBSD can operate as PAL CBSD if the owner of the CBSD owns a PAL license in a geographic area where CBSD is deployed.[3] For CBRS, each PAL license is granted access to a PAL channel (which for CBRS has a 10 MHz bandwidth) in PAL frequency spectrum (which for CBRS is the first 100 MHz of CBRS band). SAS(s) must regulate co-channel interference[4] from GAA CBSD(s) in a PAL channel in which a PAL CBSD receives and in a region around one or more PAL CBSD transmitting on the PAL channel. The region around one or more PAL CBSDs using PAL channels is referred to as a PAL protection area (PPA).[5]

[3] A PAL user means a user who has a license to operate in PAL frequency spectrum in a geographic region (e.g., a county). A PAL CBSD means a CBSD operated by a PAL user.
[4] Co-channel means in the same frequency spectrum or channel. Thus, co-channel interference means interference in a channel used for reception by a CBSD, e.g., a PAL CBSD. Frequency spectrum (or frequency channel or channel) means a bandwidth centered about a center frequency. Unless otherwise indicated herein, power as used herein means power or power spectral density.
[5] Analogous to a PPA, interference must also be regulated within an area known as a grandfathered wireless protection zone (GWPZ). A GWPZ is a geographic area and frequency range in which grandfathered wireless licensees receive protection from CBSD transmission.

The SAS uses propagation model(s) to ascertain co-channel interference in such a region in a PAL channel. Propagation model(s) are subject to errors, e.g., due to variations in terrain morphology, because structures are not modelled correctly, etc.

Also, the SAS, however, is not required to regulate cross link channel interference[6] in a PAL channel in which a PAL CBSD receives. Further, the SAS is also not required to regulate co-channel interference and cross link channel interference, from PAL CBSD(s) and/or other GAA CBSD (s), in a channel in which a GAA CBSD receives.[7]

[6] Cross link interference means interference, in a channel in which a CBSD receives signals, and originating from transmissions in an adjacent channel.
[7] Thus, for example, the SAS may authorize a category B type CBSD, i.e., a CBSD capable of a higher maximum transmit power level, to transmit at the CBSD's maximum transmission power level in a channel adjacent to another channel used by another CBSD. If the two CBSDs are geographically near one another, then the other CBSD is susceptible to cross link interference from transmissions from the category B type CBSD.

SUMMARY OF THE INVENTION

A method for determining co-channel interference and adjacent channel interference is provided. The method comprises: receiving channels in which each citizens broadband radio service device (CBSD) of a CBSD network (network CBSD) receives and a geographic location of each network CBSD; requesting measurements, from a set of user equipment (UE) connected to each network CBSD, on the channels and adjacent channels, wherein adjacent channels means a first channel, where a lowest frequency of the first channel is adjacent to a highest frequency of a channel of a corresponding network CBSD, and a second channel, where a highest frequency of the second channel is adjacent to a lowest frequency of the channel; receiving measurement reports from the set of UE; determining a location of each UE, of the set of UE, providing a measurement report; using data from the measurement reports from each UE connected to a network CBSD and a network CBSD's geographic location, determining (a) a co-channel interference level and a cross link interference level in each channel at the geographic location of each network CBSD, and (b) a frame structure for each non-network CBSD generating cross link interference in a channel at the geographic location of each network CBSD; determining each network CBSD that has at least one of: (a) a co-channel interference level greater than a co-channel interference threshold level is determined and (b) a cross link channel interference level greater than a cross link channel interference threshold level; determining whether at least one network CBSD has a co-channel interference greater than the co-channel interference threshold level; determining that there is at least one network CBSD that has a co-channel interference level greater than the co-channel interference threshold level, then determining whether there is at least one available channel for each network CBSD having a co-channel interference level greater than the co-channel interference level, wherein an available channel means a channel in spectrum shared by a network CBSD and an incumbent user and in which aggregate co-channel interference in the channel and at each protection point whose neighborhood area encompasses the network CBSD is less than a corresponding protection point interference threshold level; determining that there is at least one available channel for each network CBSD having a co-channel interference level greater than the co-channel interference level, then selecting an available channel having a largest maximum transmit power and transmitting the selected available channel to a corresponding network CBSD, wherein the corresponding network CBSD is configured to receive on the available channel; determining whether at least one network CBSD have a cross link channel interference level greater than the cross link channel interference threshold level; and determining that at least one network CBSD have a cross link channel interference level greater than the cross link channel interference threshold level, then, for each network CBSD having a cross link channel interference level greater than the cross link channel interference threshold level, determining an effect to uplink and downlink data throughput of each such network CBSD if such network CBSD were to adopt each of one or more different frame structures of a non-network CBSD which causes cross link channel interference at a corresponding network CBSD, and generating and transmitting a report including each such effect, wherein the corresponding network CBSD and at least one interfering non-network CBSD are configured to have a same frame structure during reception and transmission, and wherein frame structure means a sequence and a number of at least one of uplink, downlink, and special subframes, a duration of each subframe, and a start time with respect to a reference time of each frame.

A non-transitory computer readable medium storing a program causing at least one processor of a spectrum access system (SAS) to execute a process to determine co-channel interference and adjacent channel interference is provided. The process comprises: receiving channels in which each citizens broadband radio service device (CBSD) of a CBSD network (network CBSD) receives and a geographic location of each network CBSD; requesting measurements, from a set of user equipment (UE) connected to each network CBSD, on the channels and adjacent channels, wherein adjacent channels means a first channel, where a lowest frequency of the first channel is adjacent to a highest frequency of a channel of a corresponding network CBSD, and a second channel, where a highest frequency of the second channel is adjacent to a lowest frequency of the channel; receiving measurement reports from the set of UE; determining a location of each UE, of the set of UE, providing a measurement report; using data from the measurement reports from each UE connected to a network CBSD and a network CBSD's geographic location, determining (a) a co-channel interference level and a cross link interference level in each channel at the geographic location of each network CBSD, and (b) a frame structure for each non-network CBSD generating cross link interference in a channel at the geographic location of each network CBSD; determining each network CBSD that has at least one of: (a) a co-channel interference level greater than a co-channel interference threshold level is determined and (b) a cross link channel interference level greater than a cross link channel interference threshold level; determining whether at least one network CBSD has a co-channel interference greater than the co-channel interference threshold level; determining that there is at least one network CBSD that has a co-channel interference level greater than the co-channel interference threshold level, then determining whether there is at least one available channel for each network CBSD having a co-channel interference level greater than the co-channel interference level, wherein an available channel means a channel in spectrum shared by a network CBSD and an incumbent user and in which aggregate co-channel interference in the channel and at each protection point whose neighborhood area encompasses the network CBSD is less than a corresponding protection point interference threshold level; determining that there is at least one available channel for each network CBSD having a co-channel interference level greater than the co-channel interference level, then selecting an available channel having a largest maximum transmit power and transmitting the selected available channel to a corresponding network CBSD, wherein the corresponding network CBSD is configured to receive on the available channel; determining whether at least one network CBSD have a cross link channel interference level greater than the cross link channel interference threshold level; and determining that at least one network CBSD have a cross link channel interference level greater than the cross link channel interference threshold level, then, for each network CBSD having a cross link channel interference level greater than the cross link channel interference threshold level, determining an effect to uplink and downlink data throughput of each such network CBSD if such network CBSD were to adopt each of one or more different frame structures of a non-network CBSD which causes cross link channel interference at a corresponding network CBSD, and generating and transmitting a report including each such effect, wherein the corresponding network CBSD and at least one interfering non-network CBSD are configured to have a same frame structure during reception and transmission, and wherein frame structure means a sequence and a number of at least one of uplink, downlink, and special subframes, a duration of each subframe, and a start time with respect to a reference time of each frame.

An apparatus for determining co-channel interference and adjacent channel interference is provided. The apparatus comprises: processing circuitry configured to: receive channels in which each citizens broadband radio service device (CBSD) of a CBSD network (network CBSD) receives and a geographic location of each network CBSD; request measurements, from a set of user equipment (UE) connected to each network CBSD, on the channels and adjacent channels, wherein adjacent channels means a first channel, where a lowest frequency of the first channel is adjacent to a highest frequency of a channel of a corresponding network CBSD, and a second channel, where a highest frequency of the second channel is adjacent to a lowest frequency of the channel; receiving measurement reports from the set of UE; determining a location of each UE, of the set of UE, providing a measurement report; using data from the measurement reports from each UE connected to a network CBSD and a network CBSD's geographic location, determine (a) a co-channel interference level and a cross link interference level in each channel at the geographic location of each network CBSD, and (b) a frame structure for each non-network CBSD generating cross link interference in a channel at the geographic location of each network CBSD; determine each network CBSD that has at least one of: (a) a co-channel interference level greater than a co-channel interference threshold level is determined and (b) a cross link channel interference level greater than a cross link channel interference threshold level; determine whether at least one network CBSD has a co-channel interference greater than the co-channel interference threshold level; determine that there is at least one network CBSD that has a co-channel interference level greater than the co-channel interference threshold level, then determine whether there is at least one available channel for each network CBSD having a co-channel interference level greater than the co-channel interference level, wherein an available channel means a channel in spectrum shared by a network CBSD and an incumbent user and in which aggregate co-channel interference in the channel and at each protection point whose neighborhood area encompasses the network CBSD is less than a corresponding protection point interference threshold level; determine that there is at least one available channel for each network CBSD having a co-channel interference level greater than the co-channel interference level, then selecting an available channel having a largest maximum transmit power and transmitting the selected available channel to a corresponding network CBSD, wherein the corresponding network CBSD is configured to receive on the available channel; determine whether at least one network CBSD have a cross link channel interference level greater than the cross link channel interference threshold level; and determine that at least one network CBSD have a cross link channel interference level greater than the cross link channel interference threshold level, then, for each network CBSD having a cross link channel interference level greater than the cross link channel interference threshold level, determine an effect to uplink and downlink data throughput of each such network CBSD if such network CBSD were to adopt each of one or more different frame structures of a non-network CBSD which causes cross link channel interference at a corresponding network CBSD, and generate and transmit a report including each such effect, wherein the corresponding network CBSD and at least one interfering non-network CBSD are configured to have a same frame structure during reception and transmission, and wherein frame structure means a sequence and a number of at least one of uplink, downlink, and special subframes, a duration of each subframe, and a start time with respect to a reference time of each frame.

BRIEF DESCRIPTION OF THE DRAWINGS

Comprehension of embodiments of the invention is facilitated by reading the following detailed description in conjunction with the annexed drawings, in which:

FIG. 4 illustrates flow diagram of a method of another embodiment of scheduling measurements of UE(s) connected to network CBSD(s).

DETAILED DESCRIPTION

Figure 1A:
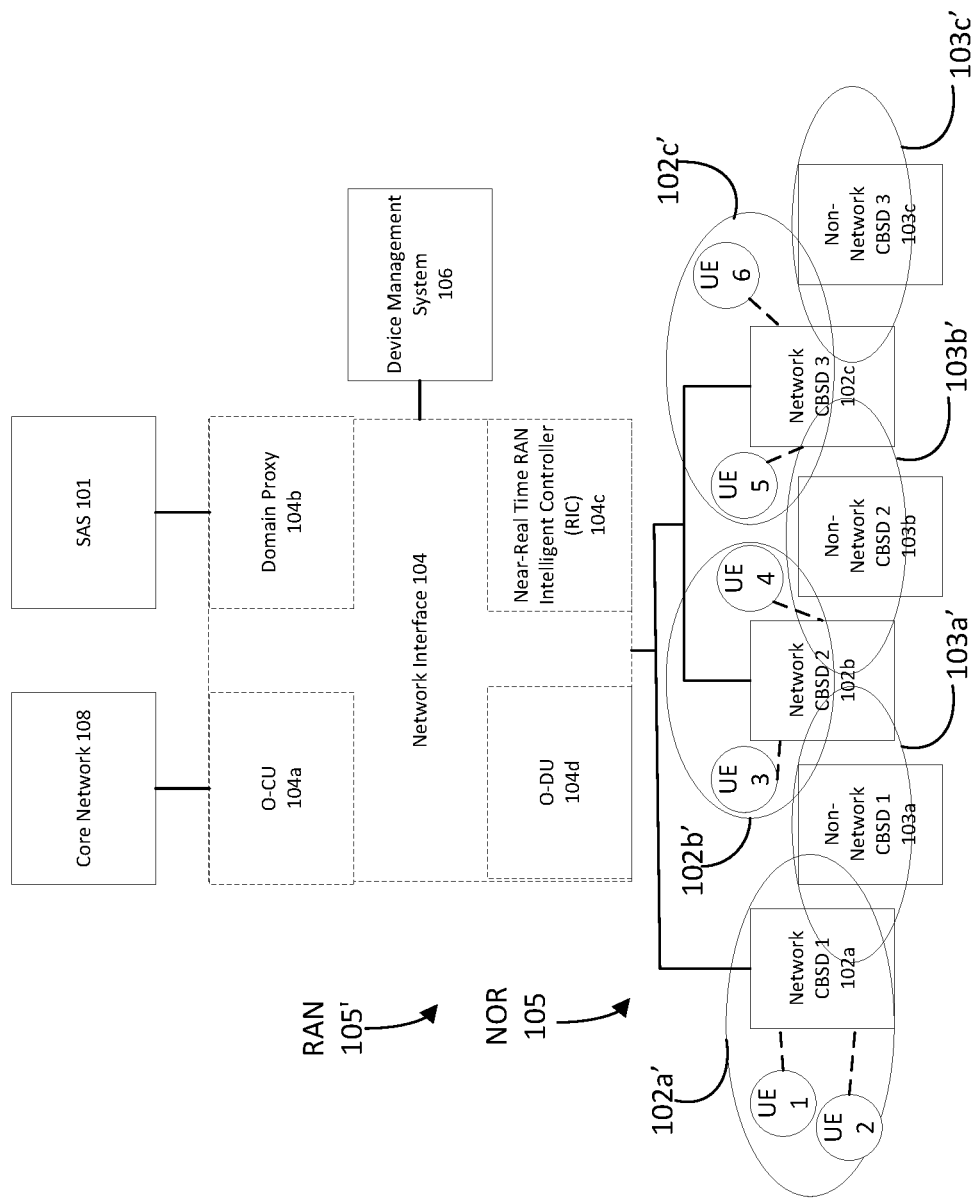
FIG. 1A illustrates a block diagram of one embodiment of a communications system utilizing a network of CBSDs, a coverage area of each CBSD of the network, user equipment connected to CBSDs of the network, non-network CBSDs, and a coverage area of each non-network CBSD.

Embodiments of the invention implement techniques to cause user equipment, connected to a CBSD(s) of a network of CBSD(s), to provide measurement report(s). The CBSD(s) may be PAL and/or GAA CBSD(s). The CBSD(s) of the network of CBSD(s) have been granted authorization to transmit in channels in shared spectrum[8] whose access is controlled by a SAS. By utilizing the user equipment to provide such measurement reports, optionally, the CBSD(s) of the network need not make such measurements because making such measurement would disrupt the CBSD(s) from providing communications services to UE(s).

[8] Shared spectrum (or shared frequency spectrum) means frequency spectrum utilized by or protected in: (a) incumbent user(s) (e.g., a receiver of a fixed satellite service) and/or geographic region(s) to be maintained interference free (e.g., a grandfather wireless protection zone (GWPZ) or priority access license (PAL) protection area (PPA), a geographic location of an environmental sensing capability (ESC) system receiver(s) and/or an exclusion zone) and (b) at least one of priority access licensee (PAL) CBSD(s) and GAA CBSD(s).

Based upon data from first received measurement reports and corresponding geographic locations of CBSD(s) of the network, a co-channel interference level at each CBSD of the network is determined. Each GAA CBSD of the network having a co-channel interference (in a channel in which it receives) that is greater than the co-channel interference level is assigned a new channel in which it is configured to receive. Embodiments of the invention determine co-channel interference, in a PAL channel in which a PAL CBSD receives, more accurately based upon measurements rather than model(s) used by the SAS, and thus better protect a PAL CBSD from co-channel interference. Further, embodiments of the invention protect GAA CBSD's from excessive co-channel interference level in a receive channel of a GAA CBSD-which is not done by the SAS.

Based upon data from second received measurement reports and corresponding geographic locations of CBSD(s) of the network, (a) a cross link channel interference level at each CBSD of the network and (b) a frame structure for each non-network CBSD generating cross link channel interference in which a CBSD of the network is receiving are determined. For each CBSD of the network that has a cross link channel interference level greater than a cross link channel threshold level, a report is generated with frame structure(s) of the non-network CBSD(s) which cause cross link channel interference with the CBSD of the network. Each such CBSD of the network (or network CBSD) may be a GAA or a PAL CBSD. Each CBSD of the network having a cross link channel interference level greater than a cross link channel interference threshold level and/or one or more of the non-network CBSD(s) causing the cross link channel interference with the CBSD are configured to have a same frame structure during reception and transmission. Thus, embodiments of the invention protect both PAL and GAA CBSDs from cross link-which are not accounted for by the SAS.

Prior to describing the invention, additional information about CBRS is provided. Although embodiments of the invention are applicable to and may be exemplified in the context of CBRS for pedagogical purposes, the embodiments are applicable to other shared spectrum systems, such as for example licensed spectrum access systems or authorized access systems. Thus, a CBSD may be more generally referred to as a radio.

A CBRS system comprises general authorized access (GAA) and/or priority access license (PAL) CBSDs and a SAS. The transmissions of the CBSD(s) are controlled by the SAS to maintain incumbent users and geographic region(s) to be free of co-channel interference[9]. The incumbent users have priority access, with respect to secondary users such as CBSDs, to some or all of spectrum in the shared spectrum. When interference requirements are satisfied, a SAS is configured to grant a CBSD access to transmit in the shared spectrum, including authorizing a channel requested by the CBSD, and authorizing a corresponding maximum transmission power requested by the CBSD or assigning a lower than the requested maximum transmission power. Maximum transmit power (or maximum transmit power level) means a maximum power level that the CBSD can transmit while ensuring that an aggregate interference level, e.g., at each protection point representing an incumbent user, a PPA, a FSS, an Environmental Sensing Capability (ESC) sensors and any other point or region which should be free of co-channel interference, remains at or below a permissible interference threshold level.[10]

[9] Free of co-channel interference as used herein does not mean an absence of co-channel interference, but rather means an acceptable level of co-channel interference (i.e., a level of interference below a threshold level of interference) which may be no interference or a finite level of interference; thus, to determine if a geographic location, e.g., of an incumbent user or a geographic region to be maintained interference free, is free of interference, whether the co-channel interference level is below the acceptable level of interference (or a threshold interference) is determined. The acceptable level of co-channel interference may vary by the type of incumbent user or geographic region, frequency spectrum, and/or other indicia.

[10] Power levels for a shared spectrum system, such as a CBRS, may be characterized in terms of power spectral density levels. Optionally, power or power spectral density may be a level radiated by antenna(s) electrically coupled to a transmitter of a CBSD and characterized in terms of effective isotropic radiated power (EIRP).

PAL CBSDs have second (or intermediate) priority, after incumbent users, to utilize a portion of the shared spectrum free of co-channel interference from GAA users. An ability of a PAL CBSD to operate shall be limited temporally, geographically, and/or spectrally within the specifications of its license.

GAA CBSDs have third, or lowest, priority to utilize the frequency spectrum controlled by the SAS. In one embodiment, an operation of GAA CBSDs will be governed by laws, regulations, and/or rules (e.g., pertaining to CBRS). Such laws, regulations, and/or rules may be established by government(s) and/or standards bodies (e.g., Wireless Innovation Forum or WInnForum). Optionally, a GAA CBSD shall be able to transmit only when incumbent user(s) and PAL CBSD(s) are free of co-channel interference when the GAA CBSD transmits.

FIG. 1A illustrates a block diagram of one embodiment of a communications system utilizing a network of CBSDs, a coverage area of each CBSD of the network, user equipment connected to CBSDs of the network, non-network CBSDs, and a coverage area of each non-network CBSD. The communications system comprises the network 105 of CBSDs 102a, 102b, 102c (or network of radios (NOR) 105). Each CBSD 102a, 102b, 102c of the network may be a GAA or a PAL CBSD. Optionally, each CBSD 102a, 102b, 102c of the NOR 105 has the same frame structure, and thus, e.g., is part of a same co-existence group[11]; thus, optionally, each CBSD 102a, 102b, 102c of the NOR 105 may be part of the same interference coordination group or spectrum reuse group. Each CBSD 102a, 102b, 102c has a corresponding coverage area 102a', 102b', 102c'.

[11] Co-existence groups are further described in WinnForum document WINNF-TR-2003, Operations for Citizens Broadband Radio Service (BRS); GAA Spectrum Coordination-Approach 1 Technical Report, Version V1.0.0, May 31, 2019, which is incorporated by reference herein in its entirety.

Each CBSD 102a, 102b, 102c may be a GAA or a PAL CBSD. A CBSD may a base station (e.g., eNodeB or gNodeB), a component (e.g., a radio unit) of an active or passive distributed antenna system (DAS), a radio point of CommScope's OneCell® communications system, or another type of communications component. The DAS and OneCell® are examples of multi-operator wireless communication systems used by one or more network operators. The base station may be a pico cell base station, small cell base station, or a base station having a different coverage area.

GAA CBSDs may be of two types: category A (low transmission power) and category B (high transmission power). Category A has a maximum transmission power spectral density of 30 dBm/10 MHz. Category B has a maximum transmission power spectral density of 47 dBm/10 MHz.

A coverage area means a geographic area in which a CBSD can communicate with user equipment. A UE may be a mobile communications device, e.g., a cell or smart phone or a tablet, or a fixed wireless access communications device, e.g., consumer premises equipment.

Connect means that user equipment has formed a communications link with a CBSD. UE connected to a CBSD are in a coverage area of the CBSD and registered to communicate through and/or with the CBSD. A first UE UE1 and a second UE UE2 are each illustrated being in a first coverage area 102a' of and connected to a first network CBSD 102a. A third UE UE3 and a fourth UE UE4 are each illustrated being in a second coverage area 102b' of and connected to a second network CBSD 102b. A fifth UE UE5 and a sixth UE UE6 are illustrated being in a third coverage area 102a' of and connected to a third network CBSD 102a.

FIG. 1A also illustrates non-network CBSDs 103a, 103b, 103c which are not part of the NOR 105. Each non-network CBSD 103a, 103b, 103c has a coverage area 103a', 103b', 103c' which overlaps at least one coverage area 102a', 102b', 102c' of a network CBSD 102a, 102b, 102c of the NOR 105. Thus, transmissions from one or more non-network CBSDs 103a, 103b, 103c may cause co-channel and/or cross-link interference with one or more network CBSDs 102a, 103b, 103c. Non-network CBSD(s) are CBSD(s) which are not part of the NOR 105.

Each CBSD of the NOR 105 is connected to a core network 108 and to a SAS 101. Optionally, each CBSD of the network 105 is connected, through a network interface (or network interface circuitry) 104, to the core network 108 and/or the SAS 101. For pedagogical purposes, the NOR 105 of CBSDs is illustrated as being connected to both the core network 108 and the SAS 101 through the network interface 104.

FIG. 1A also illustrates the use of components of an Open Radio Access Network (O-RAN) which is a form of a radio access network (RAN) 105'. If used in a radio access network (RAN) that is O-RAN compliant, each CBSD would be an O-RAN compliant radio unit (O-RU). When a radio access network is compliant with O-RAN specifications, the network interface 104 comprises a near-real time radio access network intelligent controller (RIC) 104c, and an O-RAN compliant distributed unit (O-DU) 104d and an O-RAN compliant central unit (O-CU) 104a. The O-DU 104d and the O-CU 104a provide baseband signal functionality of a conventional baseband unit, e.g., used in 3G and 4G specification compliant RANs. The O-CU 104a is a logical node which hosts a radio resource control (RRC) protocol, a serviced data adaption (SDAP) protocol, and a packet data convergence protocol (PDCP). Optionally, the O-CU 104a is executed in a remote computing system, e.g., a cloud computing system.

The O-DU 104d is a logical node hosting radio link control (RLC) layer, media access control (MAC) layer, and high-PHY layer. Optionally, the O-DU 104d is executed in a remote computing system, e.g., a cloud computing system, or in processing circuitry co-located with the O-RU.

The RIC 104c is a logical function that enables near real time control optimization of O-RAN elements and resources via fine grain data collection and action, e.g., over an E2 interface coupling the RIC 104c to each of the O-CU 104a and the O-DU 104d. If a non-O-RAN implementation is used, then optionally a baseband unit (BBU) may be used in lieu of and provide all or some of the functionality of the O-DU 104*d*, O-CU 104*a* and RIC 104*c*.

Whether or not a RAN 105' is implemented as an O-RAN, optionally the network interface 104 comprises a domain proxy 104*b*. The domain proxy 104*b* is configured to: (a) manage communications between the SAS 101 and component(s) of the NOR 105 (e.g., individual and/or groups of CBSD(s) 102*a*, 102*b*, 102*c*, and/or baseband unit(s)) (or O-RAN equivalents, i.e., an O-CU 104*a* and an O-DU 104*d*); and (b) optionally, translate communications protocols used by the SAS 101 and component(s), e.g., CBSD(s), of the NOR 105.

Optionally a device management system 106 may be communicatively coupled to the NOR 105, including individual CBSD(s) comprising the NOR 105. If the optional network interface 104 is used, then the device management system 106 may be communicatively coupled to the NOR 105, including individual CBSD(s) comprising the NOR 105, through the NOR 105 or directly to the NOR 105 and its constituent CBSD(s). The device management system 106 is configured to provide configuration, management, and optimization of parameters of the CBSD(s) comprising the NOR 105.

Figure 1B:
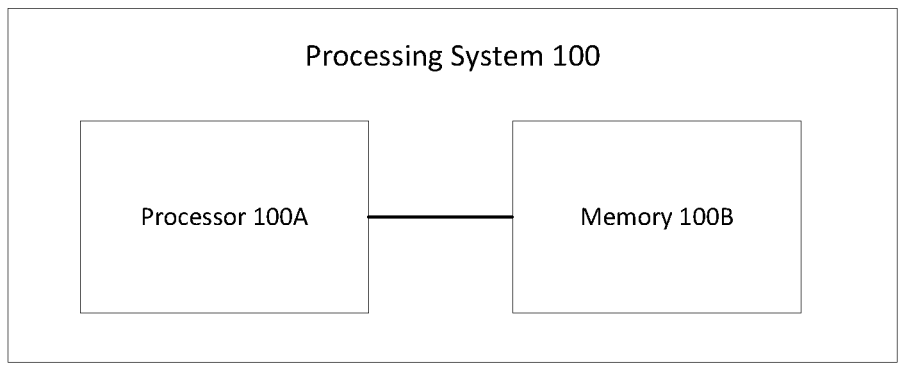
FIG. 1B illustrates a block diagram of one embodiment of a processing system.

FIG. 1B illustrates a block diagram of one embodiment of a processing system (or processing circuitry) 100. The processing system 100 comprises a processor (or processor circuitry) 100A electrically coupled to a memory (or memory circuitry) 100B. The processing system 100 may be implemented in other ways, including without limitation as a state machine, quantum computer, or any combination of the foregoing including the illustrated processing system. The processing system 100 may be used to implement embodiments of the invention.

Figure 2:
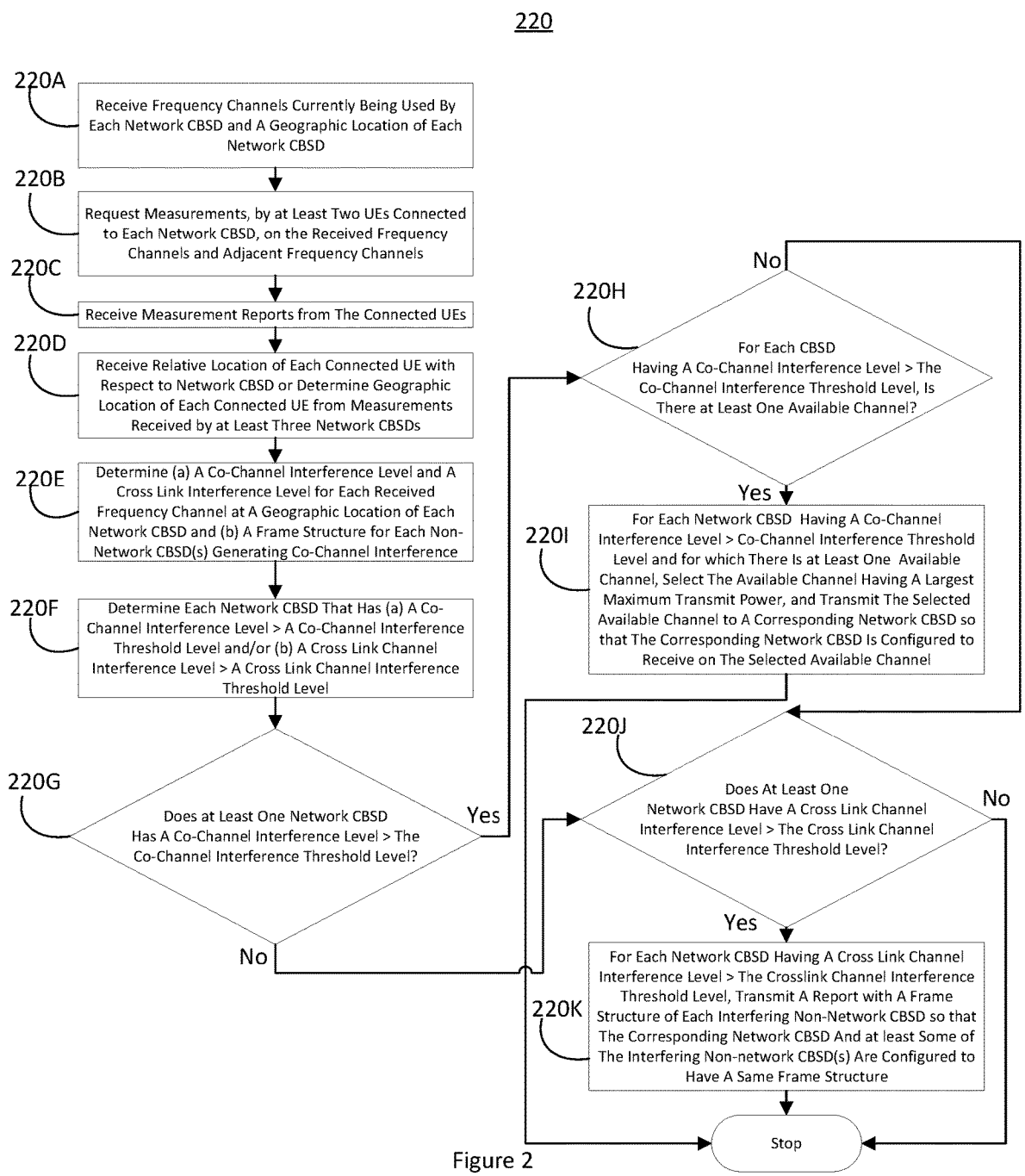
FIG. 2 illustrates a flow diagram of one embodiment of a method of selecting a new frequency channel of a network CBSD due to co-channel interference measured by user equipment and/or reporting frame structure(s) of CBSD(s) due to cross link channel interference measured by user equipment.

FIG. 2 illustrates a flow diagram of one embodiment of a method 220 of selecting a new frequency channel of a network CBSD due to co-channel interference measured by user equipment and/or reporting frame structure(s) of CBSD(s) due to cross link channel interference measured by user equipment. Optionally, the methods disclosed herein may be performed periodically, e.g., once or more after each Coordinated Periodic Activities among SASs (CPAS) performed by the SASs and before the next CPAS is performed by the SASs.

To the extent that the methods shown in any Figures are described herein as being implemented with any of the systems illustrated herein, it is to be understood that other embodiments can be implemented in other ways. Optionally, the methods disclosed herein may be implemented by the network interface 104 (or a component thereof, e.g., the O-DU 104*d*, the O-CU 104*a*, the RIC 104*c*, the domain proxy 104*b*), the device management system 106, one or more of the network CBSDs 102*a*, 102*b*, 102*c*, or another component. Optionally, the method 220 is implemented by a processing system 100 or a processor 100A thereof. PAL and GAA CBSD(s) described with respect to FIGS. 2-4 may be one or more of the CBSD(s) of the NOR 105 described elsewhere herein.

The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 220A, (a) frequency channels currently being used by each network CBSD, e.g., comprising the NOR 105 and (b) a geographic location of each network CBSD. In block 220B, measurements, by UEs connected to network CBSD(s), on the frequency channels and adjacent channels, is requested. Optionally, measurements are requested from at least two UEs connected to each network CBSD. Block 220B may be implemented in different ways. Measurements by UE are described further in 3GPP TS 38.33 V15.6.0 published by the 3rd Generation Partnership Project (June 2019) and in U.S. Pat. No. 10,708,803, each of which is hereby incorporated by reference in its entirety.

Figure 3:
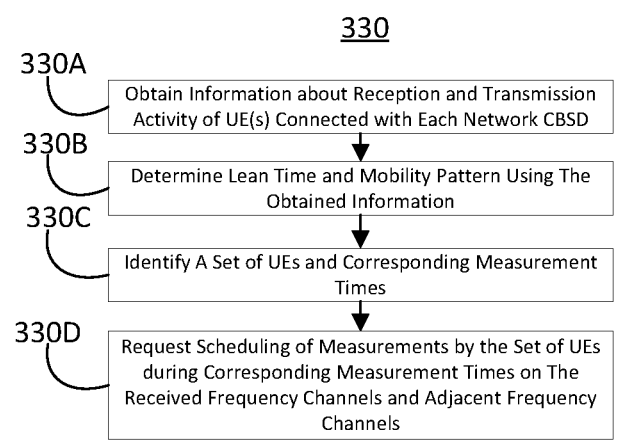
FIG. 3 illustrates a flow diagram of one embodiment of a method of scheduling measurements of UE(s) connected to network CBSD(s)

FIG. 3 illustrates a flow diagram of one embodiment of a method 330 of scheduling measurements of UE(s) connected to network CBSD(s). Thus, FIG. 3 illustrates one embodiment of an implementation of block 220B. In block 330A, information about (a) reception and transmission activity and (b) geographic location, over a period of time, of UE(s) registered with each network CBSD, e.g., comprising the NOR 105, is obtained. In block 330B, lean time and a mobility pattern of each UE connected with each network CBSD (e.g., comprising the NOR 105) is determined using the information obtained in block 330A. Lean time means at least one period of time when an aggregate amount of data transmitted between (in both directions) a connected UE and a CBSD to which the UE is connected is less than a data threshold level. Mobility pattern means a pattern of movement of each connected UE over time. The lean time may be determined applying a regression model, e.g., logistic or linear regression model to the reception and transmission information obtained in block 330A; optionally, an autoregressive integrated moving average (ARIMA) regression model may be used, The mobility pattern of a connected UE may be determined applying, to the UE geographic location information obtained in block 330A, sequential pattern data mining algorithm(s), such as Sequential Pattern Discovery using Equivalence classes (or SPADE) algorithm, frequent pattern growth algorithm, and/or any other pattern data mining algorithm. In block 330C, a set of UEs and corresponding measurement times (at which time the set of connected UEs is to perform measurements) is identified. The set of UEs comprises all or a portion of the UEs analyzed in block 330B. Optionally, the set of UEs comprises one or more or two or more UEs connected to each network CBSD of the NOR 105. Optionally, the set of UEs and corresponding measurement times is determined by performing regression analysis on the lean times and mobility patterns of each connected UE using regression analysis, e.g., a k-nearest neighbors (KNN) algorithm or any other regression algorithm. In block 330D, scheduling, of measurements by the set of UEs during the corresponding measurement times on the received frequency channels of network GAA CBSD(s) and adjacent frequency channels adjacent to each received frequency channel of network CBSD(s) (PAL and GAA network CBSD(s), is requested. Adjacent channels means a first channel (where a lowest frequency of the first channel is adjacent to a highest frequency of the received frequency channel) and a second channel (where a highest frequency of the second channel is adjacent to a lowest frequency of the received frequency channel.

FIG. 4 illustrates flow diagram of a method 440 of another embodiment of scheduling measurements of UE(s) connected to network CBSD(s). Thus, FIG. 4 illustrates another embodiment of an implementation of block 220B. In block 440A, scheduling of measurements, by UEs connected to each network CBSD, are requested. The measurements are made on (a) a frequency channel on which a network CBSD—to which a measuring UE is connected—receives (receive frequency channel) and (b) frequency channels adjacent to that receive frequency channel of the network CBSD.

Returning to FIG. 2, in block 220C, measurements reports from the UEs (of the set of UEs) are received. Each measurement report received from a UE (of the set of UEs) provides measurement(s) by the UE of signal power levels (in the received frequency channels of the network GAA CBSD(s) and/or the adjacent frequency channels of network CBSD(s)) at a corresponding measurement time.

In block 220D, a location of each UE (of the set of UEs) providing a measurement report is determined when each UE made measurements provided in the received measurement reports. UE location may be determined in different ways. Optionally, a CBSD to which the UE is connected (when making measurement(s) provided in the received measurement report) provides a relative geographic location with respect to the CBSD. The relative geographic location of the UE can be determined by combining the relative geographic location with an absolute geographic location of the CBSD to which the UE is connected (when making measurement(s) provided in the received measurement report). Optionally, an absolute geographic location of the UE is determined by based upon signals received by three or more network CBSDs and application of know techniques, e.g., such as trilateration or multilateration (e.g., time difference of arrival). Geographic location(s) of each CBSD (network CBSD(s) and optionally non-network CBSD(s)) are known, e.g., by the SAS and may be received, e.g., upon request or otherwise, as provided for in block 220A.

In block 220E, using data from the measurement reports from each UE connected to a network CBSD and the network CBSD's geographic location, (a) a co-channel interference level and a cross link interference level in each received frequency channel at a geographic location of each network CBSD, and (b) a frame structure for each non-network CBSD generating cross link interference in a received frequency channel at a geographic location of each network CBSD. Frame structure means a sequence and number of uplink, downlink, and/or special subframes, duration of each subframe, and a start time with respect to a reference time of each frame.

In block 220F, each network CBSD that has at least one of: (a) a co-channel interference level greater than a co-channel interference threshold level is determined and (b) a cross link channel interference level greater than a cross link channel interference threshold level. Such co-channel threshold interference and cross link channel interference threshold levels may be set by a network operator which operates the network CBSD(s) or another entity such as a standards body.

In block 220G, whether at least one network CBSD has a co-channel interference greater than the co-channel interference threshold level is determined. If there is no network CBSD that has a co-channel interference level greater than the co-channel interference threshold level, then proceed to block 220J. If there is at least one network CBSD that has a co-channel interference level greater than the co-channel interference threshold level, then in block 220H, whether there is at least one available channel[12] for each network CBSD having a co-channel interference level greater than the co-channel interference level is determined. Optionally, an available channel may be determined in block 220K as follows. A spectrum inquiry of the SAS 101 (controlling transmission of network CBSD(s)) may be performed for each network CBSD having a co-channel interference level greater than the co-channel interference level. A spectrum inquiry response with available channels and a corresponding maximum transmit power level for each available channel is received from the SAS 101. Alternatively, an available channel can be determined by obtaining authorization to transmit on a channel issued by a SAS.

[12] Available channel means a channel in spectrum shared by a network CBSD and an incumbent user and in which aggregate co-channel interference in the channel and at each protection point (e.g., representing incumbent user(s), DPA(s), and/or PPA(s)) whose neighborhood area encompasses the network CBSD is less than a corresponding protection point interference threshold level. Neighborhood area means a geographic area, e.g., a circle, around a protection point; size, e.g., dimensions, of the neighborhood may vary based upon protection point type.

For each network CBSD having a co-channel interference level greater than a co-channel interference threshold level and for which there is at least one available channel, then, in block 220I, an available channel having a largest maximum transmit power is selected and the selected available channel is transmitted to a corresponding network CBSD. The corresponding network CBSD is configured to receive and/or transmit on the available channel. If a spectrum inquiry is used as described above, then available channel(s) are identified by the spectrum inquiry and an available channel having a largest maximum transmit power is selected from the available channel(s) identified by the spectrum inquiry.

Optionally, if there is no available channel for one or more network CBSDs having a co-channel interference level greater than a co-channel interference threshold level (in block 220I), then an alternate approach may be used as subsequently described. In the event no available channel is available for such a network CBSD, then select a channel for such network CBSD in the shared spectrum which reduces the number of CBSD(s) which have co-channel interference or which reduces the level of co-channel interference at such network CBSD.

For each network CBSD having a co-channel interference level greater than a co-channel interference threshold level and for which there is no available channel, then, in block 220I, then in block 220J, whether at least one network CBSD has a cross link channel interference level greater than the cross link interference threshold level is determined.

If at least one network CBSD has a cross link channel interference level greater than the cross link channel interference threshold level, then, in block 220K, for each network CBSD having a cross link channel interference level greater than to the cross link channel interference threshold level, determine an effect to uplink and downlink data throughput of each such network CBSD if it was to adopt each of one or more different frame structures of a non-network CBSD which causes cross link channel interference at a corresponding network CBSD, and generate and transmit a report including each such effect. Optionally, if the change to uplink data throughput is below an uplink data throughput threshold level and the change to the downlink data throughput is below a downlink data throughput level for at least one frame structure of a non-network CBSD which causes cross link channel interference at a corresponding network CBSD, then cause the corresponding network CBSD to change its frame structure to the a frame structure of a non-network CBSD which causes cross link channel interference at a corresponding network CBSD and which reduces uplink and downlink data throughput the least. The report for each network CBSD having a cross link channel interference level greater than or equal to the cross link channel threshold level CBSD (or cross linked interfered network CBSD) specifies a frame structure of each non-network CBSD interfering with a corresponding network CBSD having a cross link channel level greater than or equal to the cross link channel threshold level CBSD, and the effect on uplink and downlink data throughput of the corresponding network CBSD if the corresponding network CBSD adopted each of one or more different frame structures of a non-network CBSD which causes cross link channel interference at a corresponding network CBSD. Optionally, the report is transmitted to a spectrum access system and/or at least one network operator, e.g., including a network operator of the NOR 105. Optionally, at least one of the network CBSD(s) (excluding any network GAA CBSD which has been assigned an available channel in block 220I) for which a report is transmitted and non-network CBSD(s) causing cross link interference with the at least one network CBSD(s) are configured to have a same frame structure. Changes to the frame structure may be implemented by the network operator(s) and/or the SAS 101. Changes may be made to a frame structure of a network CBSD (which is subject to cross link channel interference) and/or one or more of the non-network CBSD(s) causing cross link interference with the network CBSD.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

Exemplary Embodiments

Example 1 includes a method for determining co-channel interference and adjacent channel interference, the method comprising: receiving channels in which each citizens broadband radio service device (CBSD) of a CBSD network (network CBSD) receives and a geographic location of each network CBSD; requesting measurements, from a set of user equipment (UE) connected to each network CBSD, on the channels and adjacent channels, wherein adjacent channels means a first channel, where a lowest frequency of the first channel is adjacent to a highest frequency of a channel of a corresponding network CBSD, and a second channel, where a highest frequency of the second channel is adjacent to a lowest frequency of the channel; receiving measurement reports from the set of UE; determining a location of each UE, of the set of UE, providing a measurement report; using data from the measurement reports from each UE connected to a network CBSD and a network CBSD's geographic location, determining (a) a co-channel interference level and a cross link interference level in each channel at the geographic location of each network CBSD, and (b) a frame structure for each non-network CBSD generating cross link interference in a channel at the geographic location of each network CBSD; determining each network CBSD that has at least one of: (a) a co-channel interference level greater than a co-channel interference threshold level is determined and (b) a cross link channel interference level greater than a cross link channel interference threshold level; determining whether at least one network CBSD has a co-channel interference greater than the co-channel interference threshold level; determining that there is at least one network CBSD that has a co-channel interference level greater than the co-channel interference threshold level, then determining whether there is at least one available channel for each network CBSD having a co-channel interference level greater than the co-channel interference level, wherein an available channel means a channel in spectrum shared by a network CBSD and an incumbent user and in which aggregate co-channel interference in the channel and at each protection point whose neighborhood area encompasses the network CBSD is less than a corresponding protection point interference threshold level; determining that there is at least one available channel for each network CBSD having a co-channel interference level greater than the co-channel interference level, then selecting an available channel having a largest maximum transmit power and transmitting the selected available channel to a corresponding network CBSD, wherein the corresponding network CBSD is configured to receive on the available channel; determining whether at least one network CBSD have a cross link channel interference level greater than the cross link channel interference threshold level; and determining that at least one network CBSD have a cross link channel interference level greater than the cross link channel interference threshold level, then, for each network CBSD having a cross link channel interference level greater than the cross link channel interference threshold level, determining an effect to uplink and downlink data throughput of each such network CBSD if such network CBSD were to adopt each of one or more different frame structures of a non-network CBSD which causes cross link channel interference at a corresponding network CBSD, and generating and transmitting a report including each such effect, wherein the corresponding network CBSD and at least one interfering non-network CBSD are configured to have a same frame structure during reception and transmission, and wherein frame structure means a sequence and a number of at least one of uplink, downlink, and special subframes, a duration of each subframe, and a start time with respect to a reference time of each frame.

Example 2 includes the method of Example 1, wherein requesting measurements, from the set of UE connected to each network CBSD, on the channels and the adjacent channels comprises: obtaining information about reception and transmission activity of each user equipment (UE) connected with each network CBSD; determining a lean time and a mobility pattern of each connected UE using the obtained information; identifying the set of UE and corresponding measurement times based upon the lean time and the mobility pattern; and requesting scheduling of measurements by the set of UEs during corresponding measurement times for each UE of the set of UEs and on each received frequency channel and frequency channels adjacent to each received frequency channel.

Example 3 includes the method of Example 2, wherein determining the lean time comprises applying a regression model to the information about the reception and transmission activity; and wherein determining the mobility pattern comprises applying sequential pattern data mining algorithm to the information about the reception and transmission activity; wherein identifying the set of UE and corresponding measurement times comprises applying a regression algorithm to the lean time and the mobility pattern of each connected UE.

Example 4 includes the method of any of Examples 1-3, wherein requesting measurements, from the set of UE connected to each network CBSD, on the channels and the adjacent channels comprises periodically requesting scheduling of measurements, by at least two UE connected to each network CBSD, on the channels and the adjacent channels.

Example 5 includes the method of any of Examples 1-4, wherein requesting measurements from the set of UE connected to each network CBSD comprises requesting measurements from the set of UE comprising at least two UE.

Example 6 includes the method of any of Examples 1-5, wherein determining whether there is at least one available channel for each network CBSD having a co-channel interference level greater than the co-channel interference level comprises transmitting a spectrum inquiry to and receiving a spectrum inquiry response from a spectrum access system.

Example 7 includes the method of any of Examples 1-6, further comprising sending the report to a spectrum access system or at least one network operator which are configured to adjust a frame structure of the corresponding network CBSD and at least one non-network CBSD interfering with the corresponding network CBSD.

Example 8 includes a non-transitory computer readable medium storing a program causing at least one processor of a spectrum access system (SAS) to execute a process to determine co-channel interference and adjacent channel interference, the process comprising: receiving channels in which each citizens broadband radio service device (CBSD) of a CBSD network (network CBSD) receives and a geographic location of each network CBSD; requesting measurements, from a set of user equipment (UE) connected to each network CBSD, on the channels and adjacent channels, wherein adjacent channels means a first channel, where a lowest frequency of the first channel is adjacent to a highest frequency of a channel of a corresponding network CBSD, and a second channel, where a highest frequency of the second channel is adjacent to a lowest frequency of the channel; receiving measurement reports from the set of UE; determining a location of each UE, of the set of UE, providing a measurement report; using data from the measurement reports from each UE connected to a network CBSD and a network CBSD's geographic location, determining (a) a co-channel interference level and a cross link interference level in each channel at the geographic location of each network CBSD, and (b) a frame structure for each non-network CBSD generating cross link interference in a channel at the geographic location of each network CBSD; determining each network CBSD that has at least one of: (a) a co-channel interference level greater than a co-channel interference threshold level is determined and (b) a cross link channel interference level greater than a cross link channel interference threshold level; determining whether at least one network CBSD has a co-channel interference greater than the co-channel interference threshold level; determining that there is at least one network CBSD that has a co-channel interference level greater than the co-channel interference threshold level, then determining whether there is at least one available channel for each network CBSD having a co-channel interference level greater than the co-channel interference level, wherein an available channel means a channel in spectrum shared by a network CBSD and an incumbent user and in which aggregate co-channel interference in the channel and at each protection point whose neighborhood area encompasses the network CBSD is less than a corresponding protection point interference threshold level; determining that there is at least one available channel for each network CBSD having a co-channel interference level greater than the co-channel interference level, then selecting an available channel having a largest maximum transmit power and transmitting the selected available channel to a corresponding network CBSD, wherein the corresponding network CBSD is configured to receive on the available channel; determining whether at least one network CBSD have a cross link channel interference level greater than the cross link channel interference threshold level; and determining that at least one network CBSD have a cross link channel interference level greater than the cross link channel interference threshold level, then, for each network CBSD having a cross link channel interference level greater than the cross link channel interference threshold level, determining an effect to uplink and downlink data throughput of each such network CBSD if such network CBSD were to adopt each of one or more different frame structures of a non-network CBSD which causes cross link channel interference at a corresponding network CBSD, and generating and transmitting a report including each such effect, wherein the corresponding network CBSD and at least one interfering non-network CBSD are configured to have a same frame structure during reception and transmission, and wherein frame structure means a sequence and a number of at least one of uplink, downlink, and special subframes, a duration of each subframe, and a start time with respect to a reference time of each frame.

Example 9 includes the non-transitory computer readable medium of Example 8, wherein requesting measurements, from the set of UE connected to each network CBSD, on the channels and the adjacent channels comprises: obtaining information about reception and transmission activity of each user equipment (UE) connected with each network CBSD; determining a lean time and a mobility pattern of each connected UE using the obtained information; identifying the set of UE and corresponding measurement times based upon the lean time and the mobility pattern; and requesting scheduling of measurements by the set of UEs during corresponding measurement times for each UE of the set of UEs and on each received frequency channel and frequency channels adjacent to each received frequency channel.

Example 10 includes the non-transitory computer readable medium of Example 9, wherein determining the lean time comprises applying a regression model to the information about the reception and transmission activity; and wherein determining the mobility pattern comprises applying sequential pattern data mining algorithm to the information about the reception and transmission activity; wherein identifying the set of UE and corresponding measurement times comprises applying a regression algorithm to the lean time and the mobility pattern of each connected UE.

Example 11 includes the non-transitory computer readable medium of any of Examples 8-10, wherein requesting measurements, from the set of UE connected to each network CBSD, on the channels and the adjacent channels comprises periodically requesting scheduling of measurements, by at least two UE connected to each network CBSD, on the channels and the adjacent channels.

Example 12 includes the non-transitory computer readable medium of any of Examples 8-11, wherein requesting measurements from the set of UE connected to each network CBSD comprises requesting measurements from the set of UE comprising at least two UE.

Example 13 includes the non-transitory computer readable medium of any of Examples 8-12, wherein determining whether there is at least one available channel for each network CBSD having a co-channel interference level greater than the co-channel interference level comprises transmitting a spectrum inquiry to and receiving a spectrum inquiry response from a spectrum access system.

Example 14 includes the non-transitory computer readable medium of any of Examples 8-13, further comprising sending the report to a spectrum access system or at least one network operator which are configured to adjust a frame structure of the corresponding network CBSD and at least one non-network CBSD interfering with the corresponding network CBSD.

Example 15 includes an apparatus for determining co-channel interference and adjacent channel interference, the apparatus comprising: processing circuitry configured to: receive channels in which each citizens broadband radio service device (CBSD) of a CBSD network (network CBSD) receives and a geographic location of each network CBSD; request measurements, from a set of user equipment (UE) connected to each network CBSD, on the channels and adjacent channels, wherein adjacent channels means a first channel, where a lowest frequency of the first channel is adjacent to a highest frequency of a channel of a corresponding network CBSD, and a second channel, where a highest frequency of the second channel is adjacent to a lowest frequency of the channel; receiving measurement reports from the set of UE; determining a location of each UE, of the set of UE, providing a measurement report; using data from the measurement reports from each UE connected to a network CBSD and a network CBSD's geographic location, determine (a) a co-channel interference level and a cross link interference level in each channel at the geographic location of each network CBSD, and (b) a frame structure for each non-network CBSD generating cross link interference in a channel at the geographic location of each network CBSD; determine each network CBSD that has at least one of: (a) a co-channel interference level greater than a co-channel interference threshold level is determined and (b) a cross link channel interference level greater than a cross link channel interference threshold level; determine whether at least one network CBSD has a co-channel interference greater than the co-channel interference threshold level; determine that there is at least one network CBSD that has a co-channel interference level greater than the co-channel interference threshold level, then determine whether there is at least one available channel for each network CBSD having a co-channel interference level greater than the co-channel interference level, wherein an available channel means a channel in spectrum shared by a network CBSD and an incumbent user and in which aggregate co-channel interference in the channel and at each protection point whose neighborhood area encompasses the network CBSD is less than a corresponding protection point interference threshold level; determine that there is at least one available channel for each network CBSD having a co-channel interference level greater than the co-channel interference level, then selecting an available channel having a largest maximum transmit power and transmitting the selected available channel to a corresponding network CBSD, wherein the corresponding network CBSD is configured to receive on the available channel; determine whether at least one network CBSD have a cross link channel interference level greater than the cross link channel interference threshold level; and determine that at least one network CBSD have a cross link channel interference level greater than the cross link channel interference threshold level, then, for each network CBSD having a cross link channel interference level greater than the cross link channel interference threshold level, determine an effect to uplink and downlink data throughput of each such network CBSD if such network CBSD were to adopt each of one or more different frame structures of a non-network CBSD which causes cross link channel interference at a corresponding network CBSD, and generate and transmit a report including each such effect, wherein the corresponding network CBSD and at least one interfering non-network CBSD are configured to have a same frame structure during reception and transmission, and wherein frame structure means a sequence and a number of at least one of uplink, downlink, and special subframes, a duration of each subframe, and a start time with respect to a reference time of each frame.

Example 16 includes the apparatus of Example 15, wherein request measurements, from the set of UE connected to each network CBSD, on the channels and the adjacent channels comprises: obtain information about reception and transmission activity of each user equipment (UE) connected with each network CBSD; determine a lean time and a mobility pattern of each connected UE using the obtained information; identify the set of UE and corresponding measurement times based upon the lean time and the mobility pattern; and request scheduling of measurements by the set of UEs during corresponding measurement times for each UE of the set of UEs and on each received frequency channel and frequency channels adjacent to each received frequency channel.

Example 17 includes the apparatus of Example 16, wherein determine the lean time comprises apply a regression model to the information about the reception and transmission activity; and wherein determine the mobility pattern comprises apply sequential pattern data mining algorithm to the information about the reception and transmission activity; wherein identify the set of UE and corresponding measurement times comprises apply a regression algorithm to the lean time and the mobility pattern of each connected UE.

Example 18 includes the apparatus of any of Examples 15-17, wherein request measurements, from the set of UE connected to each network CBSD, on the channels and the adjacent channels comprises periodically request scheduling of measurements, by at least two UE connected to each network CBSD, on the channels and the adjacent channels.

Example 19 includes the apparatus of any of Examples 15-18, wherein request measurements from the set of UE connected to each network CBSD comprises request measurements from the set of UE comprising at least two UE.

Example 20 includes the apparatus of any of Examples 15-19, wherein determine whether there is at least one available channel for each network CBSD having a co-channel interference level greater than the co-channel interference level comprises transmit a spectrum inquiry to and receiving a spectrum inquiry response from a spectrum access system.

Example 21 includes the apparatus of any of Examples 15-20, further comprising send the report to a spectrum access system or at least one network operator which are configured to adjust a frame structure of the corresponding network CBSD and at least one non-network CBSD interfering with the corresponding network CBSD.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method for determining co-channel interference and adjacent channel interference, the method comprising:
   receiving channels in which each citizens broadband radio service device (CBSD) of a CBSD network (network CBSD) receives and a geographic location of each network CBSD;
   requesting measurements, from a set of user equipment (UE) connected to each network CBSD, on the channels and adjacent channels, wherein adjacent channels means a first channel, where a lowest frequency of the first channel is adjacent to a highest frequency of a channel of a corresponding network CBSD, and a second channel, where a highest frequency of the second channel is adjacent to a lowest frequency of the channel;
   receiving measurement reports from the set of UE;
   determining a location of each UE, of the set of UE, providing a measurement report;
   using data from the measurement reports from each UE connected to a network CBSD and a network CBSD's geographic location, determining (a) a co-channel interference level and a cross link interference level in each channel at the geographic location of each network CBSD, and (b) a frame structure for each non-network CBSD generating cross link interference in a channel at the geographic location of each network CBSD;
   determining each network CBSD that has at least one of:
   (a) a co-channel interference level greater than a co-channel interference threshold level is determined and
   (b) a cross link channel interference level greater than a cross link channel interference threshold level;
   determining whether at least one network CBSD has a co-channel interference greater than the co-channel interference threshold level;
   determining that there is at least one network CBSD that has a co-channel interference level greater than the co-channel interference threshold level, then determining whether there is at least one available channel for each network CBSD having a co-channel interference level greater than the co-channel interference level, wherein an available channel means a channel in spectrum shared by a network CBSD and an incumbent user and in which aggregate co-channel interference in the channel and at each protection point whose neighborhood area encompasses the network CBSD is less than a corresponding protection point interference threshold level;
   determining that there is at least one available channel for each network CBSD having a co-channel interference level greater than the co-channel interference level, then selecting an available channel having a largest maximum transmit power and transmitting the selected available channel to a corresponding network CBSD, wherein the corresponding network CBSD is configured to receive on the available channel;
   determining whether at least one network CBSD have a cross link channel interference level greater than the cross link channel interference threshold level; and
   determining that at least one network CBSD have a cross link channel interference level greater than the cross link channel interference threshold level, then, for each network CBSD having a cross link channel interference level greater than the cross link channel interference threshold level, determining an effect to uplink and downlink data throughput of each such network CBSD if such network CBSD were to adopt each of one or more different frame structures of a non-network CBSD which causes cross link channel interference at a corresponding network CBSD, and generating and transmitting a report including each such effect, wherein the corresponding network CBSD and at least one interfering non-network CBSD are configured to have a same frame structure during reception and transmission, and wherein frame structure means a sequence and a number of at least one of uplink, downlink, and special subframes, a duration of each subframe, and a start time with respect to a reference time of each frame.

2. The method of claim 1, wherein requesting measurements, from the set of UE connected to each network CBSD, on the channels and the adjacent channels comprises:
   obtaining information about reception and transmission activity of each user equipment (UE) connected with each network CBSD;
   determining a lean time and a mobility pattern of each connected UE using the obtained information;
   identifying the set of UE and corresponding measurement times based upon the lean time and the mobility pattern; and
   requesting scheduling of measurements by the set of UEs during corresponding measurement times for each UE of the set of UEs and on each received frequency channel and frequency channels adjacent to each received frequency channel.

3. The method of claim 2, wherein determining the lean time comprises applying a regression model to the information about the reception and transmission activity; and
   wherein determining the mobility pattern comprises applying sequential pattern data mining algorithm to the information about the reception and transmission activity;
   wherein identifying the set of UE and corresponding measurement times comprises applying a regression algorithm to the lean time and the mobility pattern of each connected UE.

4. The method of claim 1, wherein requesting measurements, from the set of UE connected to each network CBSD, on the channels and the adjacent channels comprises periodically requesting scheduling of measurements, by at least two UE connected to each network CBSD, on the channels and the adjacent channels.

5. The method of claim 1, wherein requesting measurements from the set of UE connected to each network CBSD comprises requesting measurements from the set of UE comprising at least two UE.

6. The method of claim 1, wherein determining whether there is at least one available channel for each network CBSD having a co-channel interference level greater than the co-channel interference level comprises transmitting a spectrum inquiry to and receiving a spectrum inquiry response from a spectrum access system.

7. The method of claim 1, further comprising sending the report to a spectrum access system or at least one network operator which are configured to adjust a frame structure of the corresponding network CBSD and at least one non-network CBSD interfering with the corresponding network CBSD.

8. A non-transitory computer readable medium storing a program causing at least one processor of a spectrum access system (SAS) to execute a process to determine co-channel interference and adjacent channel interference, the process comprising:

receiving channels in which each citizens broadband radio service device (CBSD) of a CBSD network (network CBSD) receives and a geographic location of each network CBSD;

requesting measurements, from a set of user equipment (UE) connected to each network CBSD, on the channels and adjacent channels, wherein adjacent channels means a first channel, where a lowest frequency of the first channel is adjacent to a highest frequency of a channel of a corresponding network CBSD, and a second channel, where a highest frequency of the second channel is adjacent to a lowest frequency of the channel;

receiving measurement reports from the set of UE;

determining a location of each UE, of the set of UE, providing a measurement report;

using data from the measurement reports from each UE connected to a network CBSD and a network CBSD's geographic location, determining (a) a co-channel interference level and a cross link interference level in each channel at the geographic location of each network CBSD, and (b) a frame structure for each non-network CBSD generating cross link interference in a channel at the geographic location of each network CBSD;

determining each network CBSD that has at least one of: (a) a co-channel interference level greater than a co-channel interference threshold level is determined and (b) a cross link channel interference level greater than a cross link channel interference threshold level;

determining whether at least one network CBSD has a co-channel interference greater than the co-channel interference threshold level;

determining that there is at least one network CBSD that has a co-channel interference level greater than the co-channel interference threshold level, then determining whether there is at least one available channel for each network CBSD having a co-channel interference level greater than the co-channel interference level, wherein an available channel means a channel in spectrum shared by a network CBSD and an incumbent user and in which aggregate co-channel interference in the channel and at each protection point whose neighborhood area encompasses the network CBSD is less than a corresponding protection point interference threshold level;

determining that there is at least one available channel for each network CBSD having a co-channel interference level greater than the co-channel interference level, then selecting an available channel having a largest maximum transmit power and transmitting the selected available channel to a corresponding network CBSD, wherein the corresponding network CBSD is configured to receive on the available channel;

determining whether at least one network CBSD have a cross link channel interference level greater than the cross link channel interference threshold level; and determining that at least one network CBSD have a cross link channel interference level greater than the cross link channel interference threshold level, then, for each network CBSD having a cross link channel interference level greater than the cross link channel interference threshold level, determining an effect to uplink and downlink data throughput of each such network CBSD if such network CBSD were to adopt each of one or more different frame structures of a non-network CBSD which causes cross link channel interference at a corresponding network CBSD, and generating and transmitting a report including each such effect, wherein the corresponding network CBSD and at least one interfering non-network CBSD are configured to have a same frame structure during reception and transmission, and wherein frame structure means a sequence and a number of at least one of uplink, downlink, and special subframes, a duration of each subframe, and a start time with respect to a reference time of each frame.

9. The non-transitory computer readable medium of claim 8, wherein requesting measurements, from the set of UE connected to each network CBSD, on the channels and the adjacent channels comprises:

obtaining information about reception and transmission activity of each user equipment (UE) connected with each network CBSD;

determining a lean time and a mobility pattern of each connected UE using the obtained information;

identifying the set of UE and corresponding measurement times based upon the lean time and the mobility pattern; and requesting scheduling of measurements by the set of UEs during corresponding measurement times for each UE of the set of UEs and on each received frequency channel and frequency channels adjacent to each received frequency channel.

10. The non-transitory computer readable medium of claim 9, wherein determining the lean time comprises applying a regression model to the information about the reception and transmission activity; and wherein determining the mobility pattern comprises applying sequential pattern data mining algorithm to the information about the reception and transmission activity;

wherein identifying the set of UE and corresponding measurement times comprises applying a regression algorithm to the lean time and the mobility pattern of each connected UE.

11. The non-transitory computer readable medium of claim 8, wherein requesting measurements, from the set of UE connected to each network CBSD, on the channels and the adjacent channels comprises periodically requesting scheduling of measurements, by at least two UE connected to each network CBSD, on the channels and the adjacent channels.

12. The non-transitory computer readable medium of claim 8, wherein requesting measurements from the set of UE connected to each network CBSD comprises requesting measurements from the set of UE comprising at least two UE.

13. The non-transitory computer readable medium of claim 8, wherein determining whether there is at least one available channel for each network CBSD having a co-channel interference level greater than the co-channel interference level comprises transmitting a spectrum inquiry to and receiving a spectrum inquiry response from a spectrum access system.

14. The non-transitory computer readable medium of claim 8, further comprising sending the report to a spectrum access system or at least one network operator which are configured to adjust a frame structure of the corresponding network CBSD and at least one non-network CBSD interfering with the corresponding network CBSD.

15. An apparatus for determining co-channel interference and adjacent channel interference, the apparatus comprising:
processing circuitry configured to:
receive channels in which each citizens broadband radio service device (CBSD) of a CBSD network (network CBSD) receives and a geographic location of each network CBSD;
request measurements, from a set of user equipment (UE) connected to each network CBSD, on the channels and adjacent channels, wherein adjacent channels means a first channel, where a lowest frequency of the first channel is adjacent to a highest frequency of a channel of a corresponding network CBSD, and a second channel, where a highest frequency of the second channel is adjacent to a lowest frequency of the channel;
receiving measurement reports from the set of UE;
determining a location of each UE, of the set of UE, providing a measurement report;
using data from the measurement reports from each UE connected to a network CBSD and a network CBSD's geographic location, determine (a) a co-channel interference level and a cross link interference level in each channel at the geographic location of each network CBSD, and (b) a frame structure for each non-network CBSD generating cross link interference in a channel at the geographic location of each network CBSD;
determine each network CBSD that has at least one of: (a) a co-channel interference level greater than a co-channel interference threshold level is determined and (b) a cross link channel interference level greater than a cross link channel interference threshold level;
determine whether at least one network CBSD has a co-channel interference greater than the co-channel interference threshold level;
determine that there is at least one network CBSD that has a co-channel interference level greater than the co-channel interference threshold level, then determine whether there is at least one available channel for each network CBSD having a co-channel interference level greater than the co-channel interference level, wherein an available channel means a channel in spectrum shared by a network CBSD and an incumbent user and in which aggregate co-channel interference in the channel and at each protection point whose neighborhood area encompasses the network CBSD is less than a corresponding protection point interference threshold level;
determine that there is at least one available channel for each network CBSD having a co-channel interference level greater than the co-channel interference level, then selecting an available channel having a largest maximum transmit power and transmitting the selected available channel to a corresponding network CBSD, wherein the corresponding network CBSD is configured to receive on the available channel;
determine whether at least one network CBSD have a cross link channel interference level greater than the cross link channel interference threshold level; and
determine that at least one network CBSD have a cross link channel interference level greater than the cross link channel interference threshold level, then, for each network CBSD having a cross link channel interference level greater than the cross link channel interference threshold level, determine an effect to uplink and downlink data throughput of each such network CBSD if such network CBSD were to adopt each of one or more different frame structures of a non-network CBSD which causes cross link channel interference at a corresponding network CBSD, and generate and transmit a report including each such effect, wherein the corresponding network CBSD and at least one interfering non-network CBSD are configured to have a same frame structure during reception and transmission, and wherein frame structure means a sequence and a number of at least one of uplink, downlink, and special subframes, a duration of each subframe, and a start time with respect to a reference time of each frame.

16. The apparatus of claim 15, wherein request measurements, from the set of UE connected to each network CBSD, on the channels and the adjacent channels comprises:
obtain information about reception and transmission activity of each user equipment (UE) connected with each network CBSD;
determine a lean time and a mobility pattern of each connected UE using the obtained information;
identify the set of UE and corresponding measurement times based upon the lean time and the mobility pattern; and
request scheduling of measurements by the set of UEs during corresponding measurement times for each UE of the set of UEs and on each received frequency channel and frequency channels adjacent to each received frequency channel.

17. The apparatus of claim 16, wherein determine the lean time comprises apply a regression model to the information about the reception and transmission activity; and
wherein determine the mobility pattern comprises apply sequential pattern data mining algorithm to the information about the reception and transmission activity;
wherein identify the set of UE and corresponding measurement times comprises apply a regression algorithm to the lean time and the mobility pattern of each connected UE.

18. The apparatus of claim 15, wherein request measurements, from the set of UE connected to each network CBSD, on the channels and the adjacent channels comprises periodically request scheduling of measurements, by at least two UE connected to each network CBSD, on the channels and the adjacent channels.

19. The apparatus of claim 15, wherein request measurements from the set of UE connected to each network CBSD comprises request measurements from the set of UE comprising at least two UE.

20. The apparatus of claim 15, wherein determine whether there is at least one available channel for each network CBSD having a co-channel interference level greater than the co-channel interference level comprises transmit a spectrum inquiry to and receiving a spectrum inquiry response from a spectrum access system.

21. The apparatus of claim 15, further comprising send the report to a spectrum access system or at least one network operator which are configured to adjust a frame structure of the corresponding network CBSD and at least one non-network CBSD interfering with the corresponding network CBSD.

\* \* \* \* \*